Figure 1:
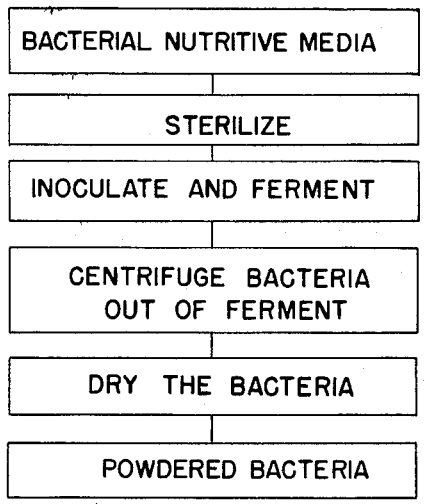

July 24, 1956 L. J. NOVAK 2,756,134
SOIL STABILIZATION
Filed Aug. 4, 1952

INVENTOR.
LEO J. NOVAK
BY
ATTORNEYS

United States Patent Office 2,756,134
Patented July 24, 1956

2,756,134
SOIL STABILIZATION

Leo J. Novak, Dayton, Ohio, assignor to The Commonwealth Engineering Company of Ohio, Dayton, Ohio, a corporation of Ohio Application August 4, 1952, Serial No. 302,525

6 Claims. (Cl. 71—1)

This invention relates to the conditioning of soils and particularly to a novel composition and method of application of a soil conditioner.

This application is related to application of Malvern J. Hiler, Serial No. 286,961, filed May 9, 1952, and assigned to the same assignee as the present invention.

The structure of soils varies widely and certain physical characteristics are vital to soils if they are to be productive. For example the structure of a productive soil must be sufficiently porous for air, water and plant roots to penetrate through the same easily; productive soils must also have the capacity to retain sufficient water for plant growth.

In addition to these basic physical characteristics the fertility of the soil, which is a function of its chemical constituency, is an important factor also; thus the availability of plant nutrients and the balance among these nutrients is a primary consideration in the productivity of soils.

This invention contemplates the provision of a novel composition which when applied to soils seeps into the ground and actually alters the mechanical structure of the soil in a beneficial manner. Thus hard packed clays, soils including the Podzols, Gray Brown Podzolic, Red Podzolic, Yellow Podzolic and Sierozens are improved materially from the standpoint of soil structure and fertility by application of the composition of invention thereto. To assist in the attainment of improved soil fertility the composition of invention may include therewith nitrogen-fixing bacteria which when grown in symbiotic relationship with certain plants fix the nitrogen of the air and convert it to organic nitrogenous compounds, thus providing a soil of high nitrogen content.

This invention further contemplates the treatment of the soil in a novel manner which insures of the production therein of an optimum of the required characteristics; thus sprinkling of the composition of invention over the soil and a moistening of the same activates the components of the composition allowing it to permeate the ground and produce a soil stabilizing agent which acts on the soil to mechanically change the structure thereof. Clay-like aggregations when incorporated with this agent are reduced to pea-sized soft, porous particles of strong adhesive power, capable of holding water, passing air, plant roots and so forth.

The invention accordingly involves the provision of a composition capable of forming in situ in the soil a bacterial polysaccharide which latter product has the noted desirable controlling effect on the soil structure. Such a composition will include a carbohydrate capable of undergoing synthesis to a polysaccharide and an organism having the capacity to induce the synthesis. Thus cane sugar and similar carbohydrates may be mixed with polysaccharide synthesizing bacteria and/or enzymes in the powdery state and the mix may be fermented upon application of water to produce the polysaccharide dextran. While the dextran polysaccharides are to be preferred in the practice of the invention, and the same will be particularly described with reference thereto, it is to be understood that other polysaccharides, such as the levans and galactans are also suitable and are intended to be encompassed by the inventive concept.

Cane sugar is to be preferred as it is readily obtainable in solid form at reasonable cost and produces, when acted upon by Leuconostoc mesenteroides bacteria and/or the dextran-sucrase enzyme in proper solution a good yield of the dextran polysaccharide. This dextran as it forms in the soil to which the composition of invention has been applied, is considered to produce an envelope around soil particles thus influencing favorably particle size distribution. Caking of the soil is accordingly inhibited.

The polysaccharide envelope performs another and important function—that of increasing the water retention capacity of the soil particles. In this respect the smallest particles, which normally tend to cake to the greatest degree, will have associated therewith the greatest percentage adsorption of the percolating carbohydrate-dextran synthesizing organism and accordingly the quantity of dextran per unit weight of soil will be greatest in connection with these smallest particles. This insures of a high degree of moisture retention and also obviates the natural tendency of these particles to agglomerate.

The ability of the dissolved composition to penetrate various soil depths is an important advantage as the dextran is thus synthesized at the places where it is most needed; distribution of the dextran is also uniform when the composition is applied in suitable quantity for adequate penetration, as the dextran itself readily permits the unsynthesized composition to percolate therethrough.

To the composition there may be added suitable agents for the control of the pH of the composition in the dissolved state. Preferably such an agent induces a slightly acidic condition in the pH range of 4.6–5.4, and synthesis of the polysaccharide is thereby facilitated.

Bacteria, particularly those of the genus Rhizobia, may be employed in conjunction with the composition of invention to increase the nitrogen content of the soil while at the same time providing desired physical characteristics to the soil.

Figure 2:
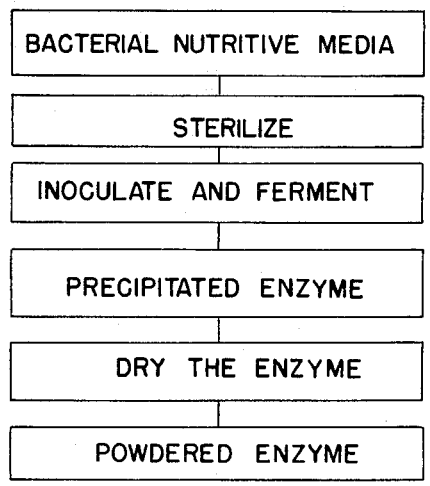

The invention will be more fully understood by reference to the following detailed description and the accompanying illustrations in which:

Figure 1 indicates the method of producing a powdered bacteria;

Figure 2 indicates the method of producing a powdered enzyme; and

Figure 3:
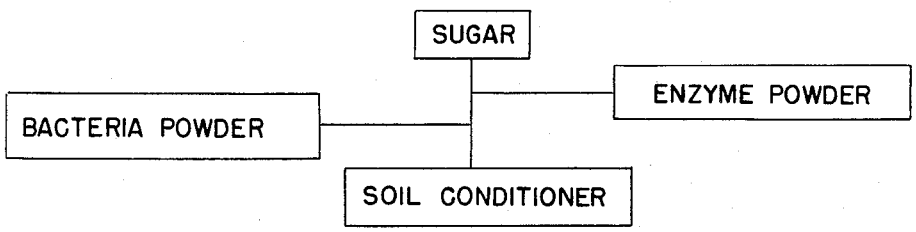
Figure 4:
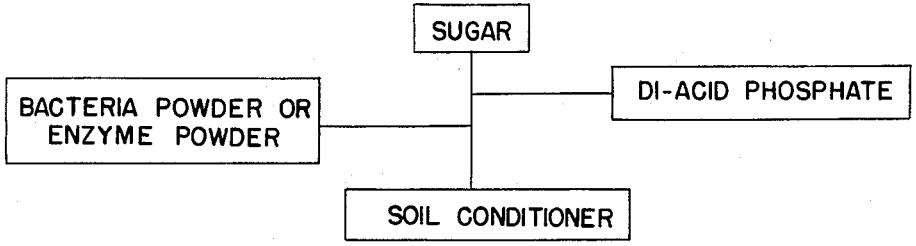

Figures 3 and 4 illustrate the composition of invention.

In the preparation of the dextran synthesizing bacteria, Leuconostoc mesenteroides B512 is preferred and may be grown in any suitable bacterial nutritive media. For example, a suitable media may contain:

4% sugar
2% $KH_2PO_4$
2% corn steep liquor solids
0.5% salt mixture

This salt mixture contains:

4% $MgSO_4.7H_2O$
0.2% NaCl
0.2% $FeSO_4.7H_2O$
0.2% $MnSO_4H_2O$
pH adjusted to 7.

The above media is sterilized, inoculated and fermented, whereafter the bacteria are centrifuged out and are carefully dried at room temperature under conditions of low humidity.

This results in the production of a bacterial powder having a high degree of activity and bacterial viability.

The enzymes which are capable of synthesizing dextran from sucrose bearing media are preferably formed by first growing *Leuconostoc mesenteroides* B512 on a suitable bacterial nutritive media as set forth above and then inoculating the same. A suitable media may contain:

2% sugar
2% $KH_2PO_4$
2% corn steep liquor solids
0.5% salt mixture

This salt mixture contains:

4% $MgSO_4.7H_2O$
0.2% NaCl
0.2% $FeSO_4.7H_2O$
0.2% $MnSO_4H_2O$
pH adjusted to 7.0–7.5

Upon the development of a maximum amount of dextran synthesizing enzymes in the fermentation, the pH is adjusted in the range of 4.6–5.4, preferably 5.2, and thereafter the crude enzyme is precipitated by saturating the solution with a suitable precipitating agent, such as ammonium sulfate. Alternatively, isopropyl alcohol to the extent of 50% by volume of the solution may be added to effect the precipitation. The precipitant may be air dried at low humidity and room temperatures to yield a powder. In some instances it may be desirable, in order to secure the powder in combination with a carrier therefor, to add about 10% of clay to the finished fermentation, whereafter the pH is adjusted to approximately 5.2. The mixture should be thoroughly stirred and then filtered and the enzyme which will develop by the fermentation will be adsorbed on the clay and retained on the filter pad. Thereafter the clay and enzyme may be air dried under conditions of low humidity and room temperature to yield a fine powder.

The composition of invention may be then prepared by mixing about 98½ pounds of sugar with about 0.5 pounds of the bacteria powder, 1 pound of the enzyme powder and a small amount of diacid phosphate. This latter component should be present in the powder in sufficient amount such that when the powder is mixed with water a pH of about 5.2 is obtained. It will be understood however that where the material is to be employed on acid soils that the quantity of the diacid phosphate may be eliminated or materially reduced, and the same effectiveness will be attained.

In a second formulation containing only sugar and bacteria powder, 99 pounds of sugar may be mixed with 1 pound of bacteria powder and sufficient diacid phosphate to obtain the above noted pH when water is added.

In a third formulation the bacteria powder is eliminated and the composition consists of 98½ pounds of sugar and 1½ pounds of enzyme powder, the diacid phosphate being present in sufficient amount to obtain the above noted pH in aqueous mixture.

In addition to the foregoing and as noted hereinbefore a dry powder consisting of nitrogen-fixing bacteria of the genus Rhizobia may be employed in conjunction with the above noted compositions to attain the nitrogen-fixing bacteria. The bacteria are grown in a nutritive media, centrifuged out and dried preferably at room temperatures and under high vacuum conditions. The resulting powder may be mixed directly with any of the compositions noted hereinbefore, preferably to the extent of between about 0.5 to 1.5 percent by weight.

It will be understood that in the use of the composition of invention it is merely necessary to mix the same with water and to spread the solution over the soil to be treated. Alternatively, the dry powder may be applied to the soil and the soil then wetted to achieve solution of the powder and assist the penetration thereof into the ground.

The quantity of soil conditioning agent which may be added to the soil satisfactorily is dependent upon the soil conditions as will be understood by one skilled in the art. However it may be generally stated that approximately 4 pounds of the composition of invention per 100 pounds of soil will effect a suitable treatment.

It will be understood that this invention is susceptible to modification in order to adopt it to different usages and conditions and accordingly, it is desired to comprehend such modifications within this invention as may fall within the scope of the appended claims.

I claim:

1. The method of conditioning soil by synthesizing therein native, unhydrolyzed dextran which comprises applying to the soil a dry, particulate mixture of cane sugar and a dextran-synthesizing agent selected from the group consisting of dextran-synthesizing bacteria of the species Leuconostoc and the enzyme produced by said bacteria so that, in the presence of moisture in the soil, the native, unhydrolyzed dextran is produced from the sugar by the action of the dextran-synthesizing agent thereon.

2. The method according to claim 1, characterized in that the dry, particulate mixture applied to the soil consists of the sugar and Leuconostoc bacteria in the ratio of about 99 pounds of the sugar to about 1.0 pound of the bacteria.

3. The method according to claim 1, characterized in that the dry, particulate mixture applied to the soil consists of the sugar and enzyme in the ratio of about 99 pounds of the sugar to about 1.0 pound of the enzyme.

4. The method according to claim 1, characterized in that the dry, particulate mixture applied to the soil consists of the sugar, bacteria and enzyme in the ratio of about 98.5 pounds of sugar to about 0.5 pound of the bacteria, to about 1.0 pound of the enzyme.

5. The method according to claim 1, characterized in that the dry, particulate mixture applied to the soil also contains an acid-reacting salt in an amount such that the pH of the mixture, in aqueous solution, is between 4.6 and 5.4.

6. The method according to claim 1, characterized in that the soil is wet with water after application of the dry, particulate mixture thereto.

References Cited in the file of this patent

UNITED STATES PATENTS

| | | |
|---|---|---|
| 2,004,706 | Nuske | June 11, 1935 |
| 2,200,532 | Bond | May 14, 1940 |
| 2,310,263 | Stahley | Feb. 9, 1943 |
| 2,392,258 | Owen | Jan. 1, 1946 |
| 2,565,507 | Lockwood et al. | Aug. 28, 1951 |

OTHER REFERENCES

Sumner et al.: Enzymes, Academic Press, 1943, page 36.

Evans et al.: Advances in Carbohydrate Chemistry, vol. II, The Academic Press, pages 210, 211, 216.

Koepsell et al.: Jour. Bact. 64, 4, October 1952, pages 521–526.